US006336066B1

(12) United States Patent
Pellenc et al.

(10) Patent No.: US 6,336,066 B1
(45) Date of Patent: Jan. 1, 2002

(54) PROCESS FOR USING LOCALIZED AGRICULTURAL DATA TO OPTIMIZE THE CULTIVATION OF PERENNIAL PLANTS

(75) Inventors: Roger Pellenc, Pertuis; Antoine Bourely, La Tour d'Aigues, both of (FR)

(73) Assignee: Pellenc S.A., Pertuis (FR)

( * ) Notice: Subject to any disclaimer, the term of this patent is extended or adjusted under 35 U.S.C. 154(b) by 0 days.

(21) Appl. No.: 09/400,480

(22) Filed: Sep. 21, 1999

(30) Foreign Application Priority Data

Sep. 29, 1998 (FR) ............................................ 98-12405

(51) Int. Cl.⁷ ......................... G06F 12/00; G06F 17/00; G06F 19/00; G06F 165/00; G06F 153/00
(52) U.S. Cl. ............................... 701/50; 25/26; 25/200; 25/201; 25/207; 25/208; 25/210; 702/2; 702/5; 86/10.2 A; 340/988; 340/995; 172/2; 172/5; 172/6; 342/22
(58) Field of Search ............................... 701/50, 25, 26, 701/201, 207, 208, 210; 702/2, 5; 56/10.2 A; 340/988, 995; 72/5, 6, 2; 342/22

(56) References Cited

U.S. PATENT DOCUMENTS

| | | | | |
|---|---|---|---|---|
| 5,438,817 A | * | 8/1995 | Nakamura ................ 56/10.2 A |
| 5,699,244 A | * | 12/1997 | Clark, Jr. et al. ............ 364/429 |
| 5,712,782 A | * | 1/1998 | Weigelt et al. ......... 364/424.07 |
| 5,837,997 A | * | 11/1998 | Beck et al. ............. 250/227.11 |
| 5,845,229 A | * | 12/1998 | Rawlins ........................ 702/2 |
| 5,850,620 A | * | 12/1998 | Skotnikov et al. ............. 702/3 |
| 5,931,882 A | * | 8/1999 | Fick et al. ..................... 701/50 |
| 5,955,973 A | * | 9/1999 | Anderson .................... 340/988 |
| 5,974,348 A | * | 10/1999 | Rocks .......................... 701/28 |
| 6,041,582 A | * | 3/2000 | Tiede et al. ............. 56/10.2 A |
| 6,061,618 A | * | 5/2000 | Hale et al. .................... 701/50 |
| 6,082,466 A | * | 7/2000 | Gudat ........................... 172/5 |
| 6,085,135 A | * | 7/2000 | Steckel ........................ 701/50 |

FOREIGN PATENT DOCUMENTS

WO          98/21928          5/1998

* cited by examiner

*Primary Examiner*—William A. Cuchlinski, Jr.
*Assistant Examiner*—Ronnie Mancho
(74) *Attorney, Agent, or Firm*—Greenblum & Bernstein, P.L.C.

(57) ABSTRACT

A process for using localized agricultural data to optimize the cultivation of perennial plants, the process including: passage through a parcel of perennial plants by a farm machine; automatic production of positioning signals at several points in the parcel, by means of an absolute positioning sensor, for example, of the differential GPS type installed on board the farm machine; automatic measurement by means of appropriate sensors of one or more pieces of agricultural data at each of these points; recording of the positioning signals and the data measured at these points by a data processing unit; processing of the positioning signals by means of a computer and an appropriate algorithm so as to organize them according to the rows of the parcel, so that the same row can be found again unambiguously during different passes; real-time or deferred representation of the positions passed through and/or the agricultural data in the form of a computer-generated map.

20 Claims, 5 Drawing Sheets

PROCESS FOR USING LOCALIZED AGRICULTURAL DATA TO OPTIMIZE THE CULTIVATION OF PERENNIAL PLANTS

BACKGROUND OF THE INVENTION

1. Field of the Invention

The present invention relates to a process for using localized agricultural data to optimize the cultivation of perennial plants.

2. Description of Background and Relevant Information

The concept of Precision Agriculture is known, and it has been widely used for about ten years in the context of large annual crops (especially grains). This novel concept arose from the discovery of two types of sensors that proved to have sufficient precision: absolute positioning of the GPS type, and on-board yield sensors.

Absolute Positioning

The GPS (Global Positioning System) is a satellite positioning system. Its principle is as follows: the U.S. Department of Defense has a set of 24 satellites in orbit around the earth; these satellites transmit, toward the earth, radio waves indicating the time and their position in space. On earth, each GPS receiver receives, at all times, the waves from at least four of these satellites: those which, at an instant t, are visible to it, i.e. not blocked by the terrestrial globe; from the transit time of the wave between transmitter and receiver, the receiver calculates its distance with respect to each visible satellite; thus, if it picks up the signals from at least four satellites, the receiver can calculate its position in space, i.e. its longitude, latitude and altitude.

The precision of this calculation is from 30 to 100 m, with a simple ("natural") GPS. To improve this precision, differential GPS (DGPS) is used: with the aid of stationary GPS receivers in known positions, the positioning errors transmitted by the satellite signals are calculated, and with the aid of these calculations, the values obtained by natural GPS receivers are corrected. The precision then becomes about 1 m.

For Precision Agriculture, DGPS is the solution adopted by most manufacturers of machines for harvesting or treating grains.

Yield Sensors

Weight measurement: There are several existing yield measuring principles for grains, but they are not adapted to the harvesting of grapes or moist products. This yield data must be corrected by the moisture content of the grain, which we also know how to measure.

These principles only work on a granular and largely dry product (about 90% dry matter). A moist product like grapes with more than 80% moisture, with a high juice content, cannot be measured with processes of this type.

That is why the Applicant developed a specific weighing system, which is the object of a Patent Application filed on Sept. 5, 1998 (Ser. No. 09/297,057), entitled "On-board Device and Method for Continuous Weighing of Harvest and Harvesting Machines Using Same," the disclosure of which is hereby incorporated by reference thereto in its entirety.

Mapping Systems

A mapping system has multiple objects, all of them being intended to help the farmer in the management of his crops over a cycle of several years, due to:

information on the potentialities of the various zones of the parcel;

an orientation to the entry of other parameters (for example, positioning of soil samplings);

an orientation to future farming operations (concept of "recommendation");

an evaluation of the results obtained through the controlled management of these crops.

The structure of a mapping system is known (see, for example, document WO 98/21928 A); it includes all or some of the following components:

an on-board absolute positioning sensor of the DGPS type;

an on-board sensor for real-time entry of the yield (or other data);

an on-board computer and entry software that synchronizes the preceding two pieces of information;

mapping software, for representing the data collected in the parcel; this software is either on-board, or available on a computer on the farm;

software to aid in the creation of maps for recommending subsequent farming operations, generally on the farm's computer.

Figure 1:
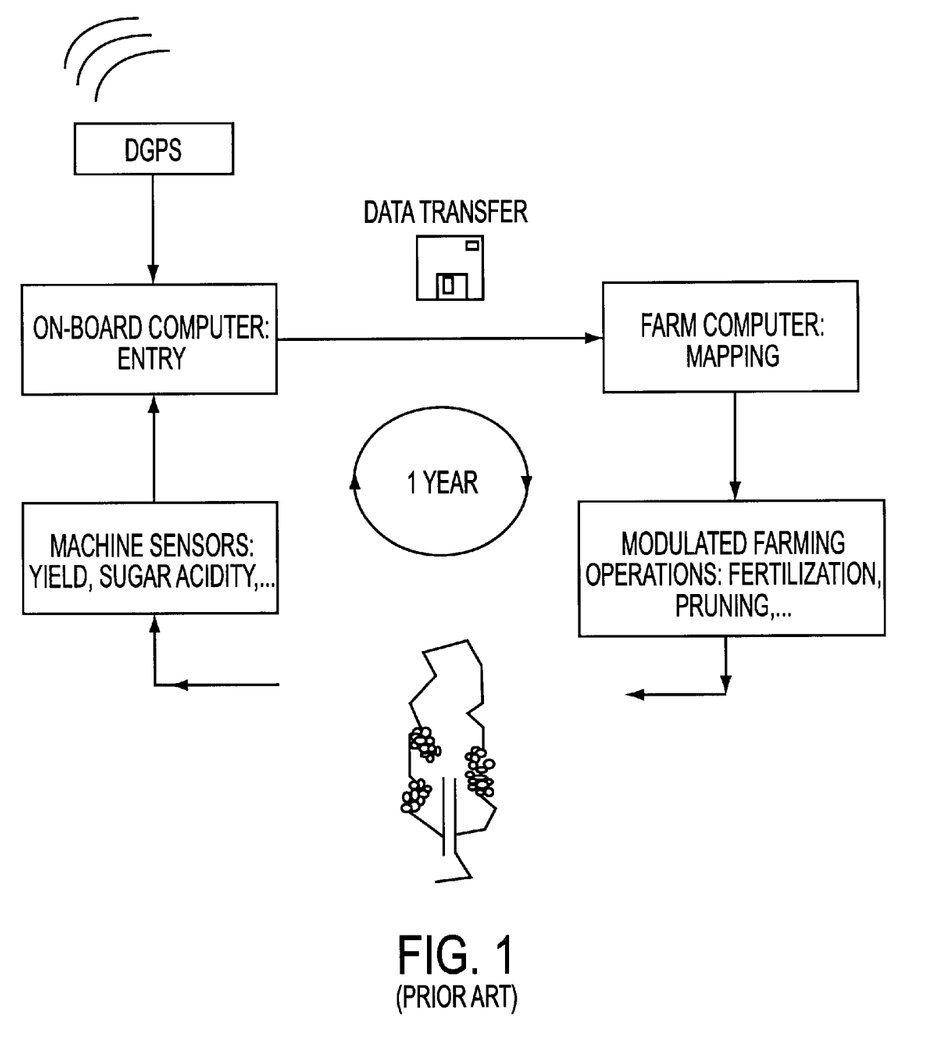
FIG. 1 is a schematic block diagram showing the cycle for improving the farming operations made possible by Precision Agriculture. In essence, it is very general, but certain elements are specific to perennial plants, particularly the measurement of the sugar content and acidity, and the modulation of the pruning.

FIG. 1 is a block diagram of a mapping system that is valid both in the general sense and in the scope of the present invention.

In the mapping software, each parcel is represented by a map with two dimensions (latitude and longitude), in which the various ranges of values are represented in specific ways: for example, it is possible to assign each range a specific color, or a specific type of hatching.

Moreover, the recommendations essentially apply to two farming operations, fertilization and spraying:

fertilization: this involves providing the plants with the nutrients, in the form of fertilizers, they lack, mainly nitrogen;

spraying (pesticides): this involves distributing products for killing the microorganisms or insects that are capable of attacking the crops, or the weeds capable of competing with them. The operation is repeated whenever a rain has washed away the previous products.

For these operations, the challenge is to optimize the quantities to be distributed, to economize on expensive products, and also to prevent the unabsorbed products from polluting the ground water.

It is possible to note some limitations of these systems, linked to the crops involved.

The known mapping software programs represent the parcel as a continuous surface, and filter the data in identical fashion in the two horizontal dimensions, so as to display homogeneous zones. There is currently no known intra-parcel mapping system adapted to grape vines or fruit trees that makes use of the row structure and displays the empty spaces between rows.

Recommendation software programs handle large-scale modulations, typically with 20 m×20 m sections. These scales correspond to the nature of these farming operations, which do not require precise positioning. There is no known modulation of these operations to the individual plant.

Finally, the precision of the positioning is limited by the rough precision of the DGPS sensor, without the possibility to improve it by using other points on the path. The paths of the machine in the field being irregular, there is no rule that makes it possible to link the points to one another in any precise way. For example, the straightness of a path, or the parallelism between two successive passes are extremely rough.

SUMMARY OF THE INVENTION

The present invention is intended for farmers growing perennial plants (particularly vine and tree growers), and it falls within the general scope of efforts to optimize the quality of the products, which is one of the major concerns of these farmers.

To contribute to the optimization of quality, Precision Agriculture tools are adapted for these crops. This requires specific tools for measuring the yields.

For viticulture, such a tool exists, due to the Applicant's invention of a grape weighing device.

For arboriculture, the concept of yield sensors only makes sense when the fruit harvest is automated. Within the scope of an automated fruit harvest, (for which the Applicant has also created machines using artificial intelligence), in which each fruit is picked individually and its size is determined, it is clear that the harvest yields are easy to establish using on-board computers.

However, even with the use of yield sensors, the simple adaptation of known Precision Agriculture concepts to perennial plants would not be of much use. In fact:

The spatial modulation of the fertilization and spraying operations provides far less of an advantage than in large crops. For example, the amounts of nitrogen constitute only a third of the quantities applied to grains.

For the other farming operations, which require locating the individual plant, especially winter pruning, the precision available with the DGPS sensor is likely to be insufficient.

The representation of the data in continuous surfaces is not adapted to the row structures of perennial plants.

When the main objective is quality, and not yield, it is essential to collect, in addition to the yields, data representing quality, particularly during harvest operations. This may include, for example, sugar content, acidity, the appearance of the grapes determined by artificial vision (presence of foreign bodies, rotting, etc.), and the size and color of the berries, also determined by artificial vision.

An object of the present invention is to overcome these limitations, and to provide farmers with a complete Precision Agriculture "tool" that makes it possible to modulate the cultivation of perennial plants to the individual plant.

The process for using localized agricultural data to optimize the cultivation of perennial plants according to the invention in characterized in that it includes the following steps:

passage through a parcel of perennial plants by a vehicle (any motor vehicle, such as, for example, a grape-harvesting machine or another farm machine) or by a person on foot;

automatic production of positioning signals at several points in the parcel during this passage, by means of an absolute positioning sensor showing its longitude, latitude and altitude, for example, of the differential GPS type, installed on board this vehicle or carried by the person on foot;

automatic measurement by means of appropriate sensors of one or more pieces of agricultural data at each of theses points, these sensors also being installed on board this vehicle or carried by the person on foot;

recording of the positioning signals and the data measured at these points by a data processing unit, installed on board this vehicle or carried by the person on foot;

processing of the positioning signals by means of a computer and an appropriate algorithm so as to improve positioning precision by using the fixed row structure in the parcel, so that the same row can be found again unambiguously during different passes;

real-time or deferred representation of the positions passed through and/or the agricultural data in the form of a computer-generated map.

According to another characteristic arrangement of the invention, a customized processing algorithm locates not only each row, but also each trunk of the perennial plants in the row, by calculating the distance traveled from one end of the row, and associates with this trunk the datum or data recorded during successive passes, which passes can be associated with farming operations that are different or are performed during different years.

The process of the invention specifically provides the advantages below:

improvement in the precision of the positioning with respect to the rough precision of the absolute positioning sensor, due to the algorithm using the fixed row structure.

elimination of any pre-surveying device or operation for characterizing the parcel. Systems of this type have great precision, but at a very high cost.

improvement of the readability of the maps by displaying the individual rows and/or the individual plants in these rows.

simple marking of individual plants, each being characterized by a row number and a plant number in the row.

modulation of farming operations to the individual plant if necessary.

According to another characteristic arrangement of the invention applied to grape vines and grape harvesting, at least two types of data, one quantitative, linked to the yield of the harvest, the other qualitative, for example, sugar content or acidity, are recorded in real time and for each measuring point.

BRIEF DESCRIPTION OF THE DRAWINGS

The above objects, characteristics and advantages, and still others, will emerge more clearly from the following description and from the figures in the attached drawings:

FIG. 2a shows a true row structure, in the typical case of a grapevine. It may be seen that the plants are in contact along the vertical axis and that any passage in the horizontal direction is impossible. This structure is characterized by two parameters, the space between rows, referenced I, and the spacing within the row, referenced E, which is clearly less than I.

FIG. 2b shows an ordered structure, but without rows. The typical example is an olive tree plantation, as found in Andalusia. The planting section is square, generally 10 m×10 m, and the axes of movement can be either the horizontal axes A or the vertical axes B.

In FIG. 4a, the rows are parallel and unevenly spaced. The spacing between two successive rows is characterized by a translation vector (D1, D2) that is different for each row.

In FIG. 4b, the rows are parallel and evenly spaced. The spacing between two successive rows is characterized by a translation vector (D1, D2) that is identical for all the rows.

In FIG. 5a, the elementary surfaces representing each range of values, each symbolized by a type of hatching, are rectangles oriented along the axes of the rows.

In FIG. 5b, each symbol represents a single individual plant, this representation only being adapted to a small scale.

DETAILED DESCRIPTION OF THE INVENTION

Row Concept and Row Detection

Given the importance of the row concept in the invention, it is important to characterize it properly.

A planting of perennial plants is structured in rows when the density of the plants in one direction is high enough to prevent the passage of farm machines in the perpendicular direction. The passage of all the machines therefore takes place along imposed routes, either above the row (straddling system), or between two adjacent rows (between-row system). Persons on foot always travel in the spaces between rows. The plantings are often in rectangular sections, with a sufficient space between rows (Euclidean distance between the axes of the rows) for the passage of a machine (on the order of 2.5 to 4 m) and a spacing of the plants within the row (on the order of 1 to 2 m).

Figure 2A:
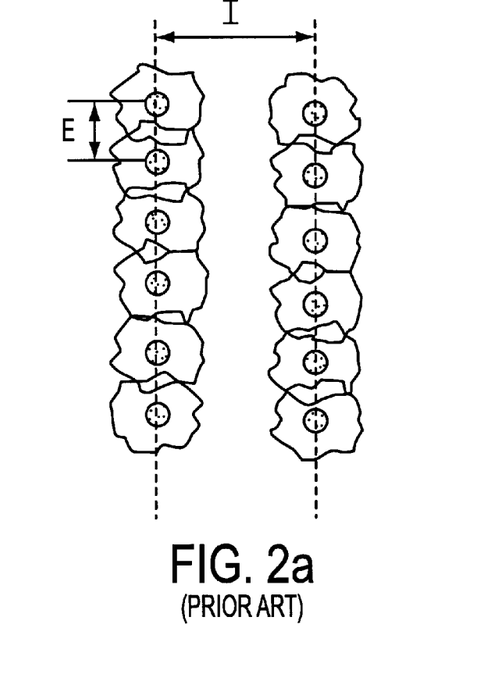
FIGS. 2a and 2b are schematic views illustrating the row concept.
Figure 2B:
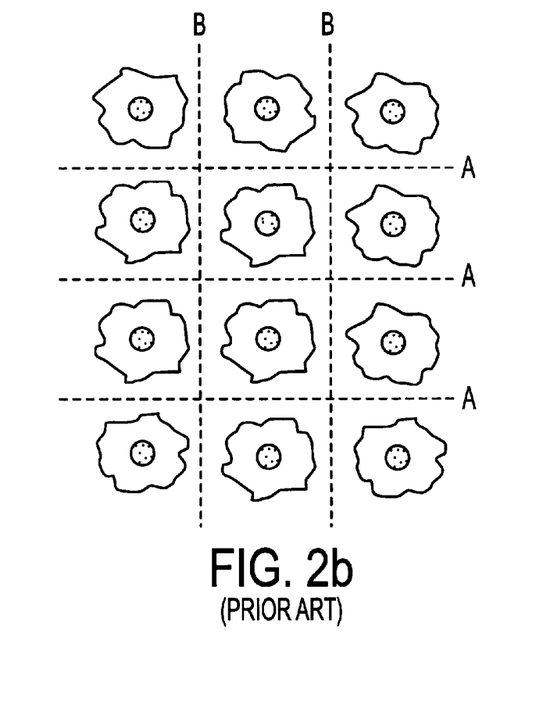

With this definition, vines without supports, even if untrained, are structured in rows, whereas Andalusian olive trees, planted in square sections of 10 m per side, are not structured in rows. For better clarity, these two significant examples are represented schematically in FIG. 2.

Even for perennial plants that are not structured in rows (FIG. 2b), it is possible to manage them like plants in rows, provided that the same axes of movement (for example the vertical axes in the figure) are always followed.

It will be noted that the paths of the machines are more repetitive in the case of straddling systems, in which the positioning tolerance across the row is typically less than +/−10 cm, whereas it is +/−20 to 30 cm for between-row systems.

The first step of all the algorithms that follow is to divide the path of the machine into distinct rows. According to another characteristic arrangement of the invention, the beginnings and ends of the rows are detected and recorded, by means of an appropriate sensor or a manual data entry. The entrance and exit of the row can be characterized by any of the following conditions:

- starting or stopping of the active elements of the machine (shaking for a grape harvester, spreading for fertilization, etc.);
- remote detection of the vegetation (wood or leaves) or its absence by an appropriate sensor, for example, with ultrasound;
- detection of a fixed marker implanted at the end of a row: a post of suitable height, a bar code plate, a metal wire buried across from the rows, etc.

Thus, a first list of rows is obtained, in the order in which they are traveled by the machine.

Reset Algorithm

To improve the precision of the absolute positioning, and to limit the influence of random disturbances, correction software, known as reset software, has been implemented and validated: it is based on the knowledge of the row structure in order to minimize errors.

Only the main features of the algorithms are presented below. The details of the calculations and the handling of specific cases will be obvious to one skilled in the art. The details of implementation that are indicated are not in any way limiting, since there are often several possible solutions.

In a first highly advantageous exemplary implementation, the precision of the positioning data is improved by the use of a correction algorithm that uses the rectilinear nature of the rows. For this reason, it is based on the straight structure of each row, independent of its neighbors (see FIG. 3). In fact, the vast majority of rows of perennial plants are straight, especially since laser planting has come into general use. The precision of the alignment is on the order of +/−2 cm.

Figure 3:
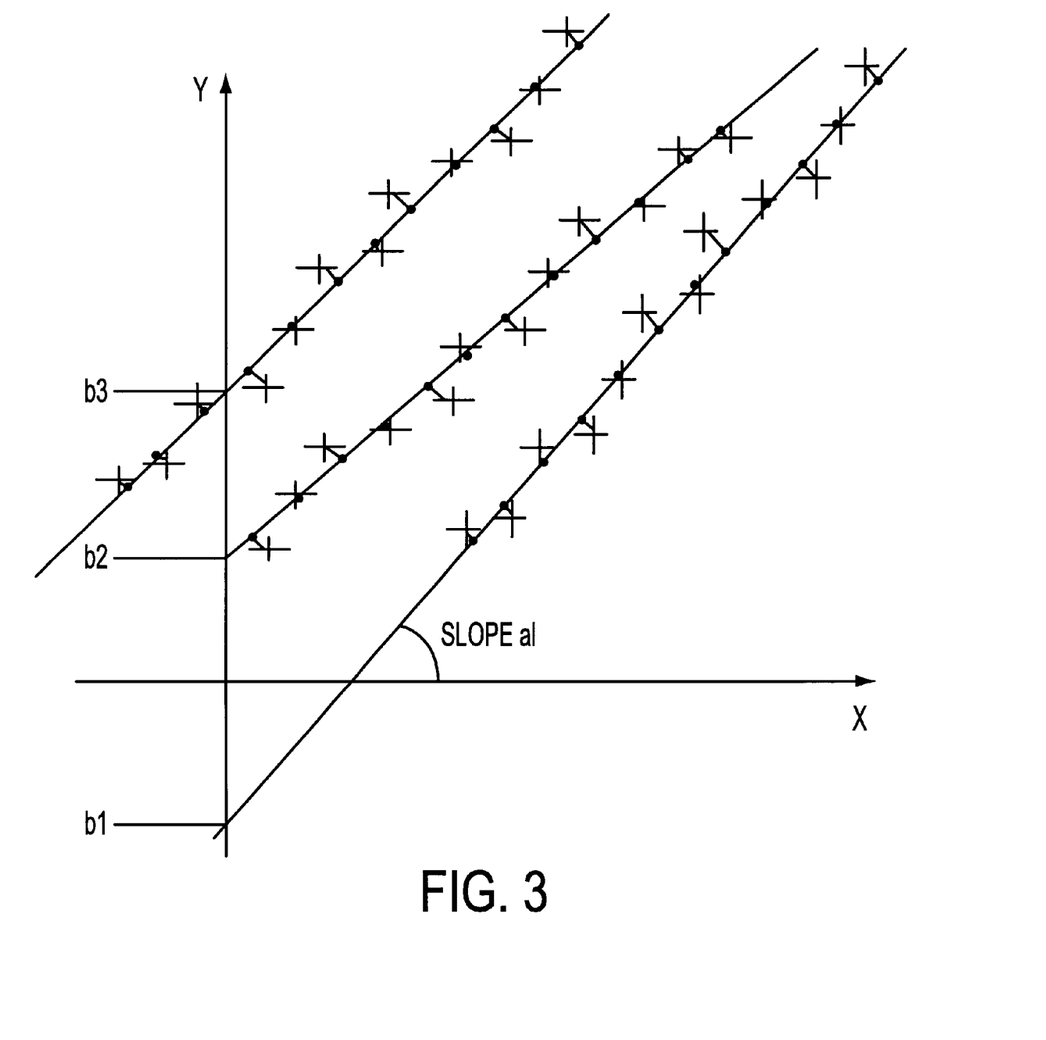
FIG. 3 schematically illustrates the projection of the rough measurement points, symbolized by crosses, onto the points marked by dots located on the axes of inertia of the individual rows. Three rows are represented, characterized by the slopes a1, a2, a3 (only a1 is shown for better clarity), and the ordinates at the origin b1, b2 and b3.

Each of the points in the scattering of points constituting a row is replaced by its orthogonal projection onto the straight line constituting the axis of inertia of the scattering. This axis of inertia is obtained by the intrinsically known, so-called "linear regression" algorithm. Generally, this axis has an equation with the form:

$$Y = a_j \cdot X + b_j$$

where aj is the slope and bj is the ordinate at the origin.

In this first version, it will be noted that the values aj and bj are specific to the row j, and not linked to one another. This results in non-parallel and unevenly spaced straight lines, as illustrated in FIG. 3.

This first version already makes it possible to reduce most of the errors perpendicular to the axis of each row. In fact, the best way to estimate of the axis of the row is to merge it with the axis of inertia of the scattering, which is determined by all of the Nj measurement points of the row j. The error made in the position of each row is then divided by ΣNj, with respect to a single measurement. However, for each point of the row, the component of the positioning error along the row is not corrected.

According to another characteristic arrangement of the invention, the precision of the positioning data is improved by the use of a correction algorithm that uses the parallelism of the rows, straight or not, as explained below.

A second exemplary implementation uses the parallelism of the rows relative to one another, assuming that they are still straight. Here again, the vast majority of plantings maintain this parallelism with very good precision. For this reason, a linear regression is performed on all the rows simultaneously, imposing the same slope for all. To do this, it suffices to find the values (a, b1, b2, . . . , bn) that minimize the error expression:

$$E^2 = \Sigma_{i,j}[Y(i,j) - a \cdot X(i,j) - b_j]^2$$

for all the measurement points numbering i located in the row j.

The values of a and bj are obtained without any difficulty by writing that the derivative of $E^2$ with respect to each of them is null, and by solving the system of linear equations obtained.

The precision obtained on the slope a is much better than in the preceding example, since it is determined by all of the points of the parcel (sum of the Njs), and not of one single row. However, the precision on the ordinates at the origin is of the same order.

In a third exemplary implementation, the reset algorithm is calculated so as to use not only the parallelism of the rows, but also an even more frequent characteristic of the latter, their even spacing. In this case, it is required that the bjs be in arithmetic progression relative to one another, i.e., they follow a rule with the form:

$$bj=b_0+d\cdot j$$

Then the triplet (a, $b_0$, d) is sought in the same way as before, and the expression to be minimized becomes:

$$E^2=\Sigma_{i,j}[Y(i,j)-a\cdot X(i,j)-b_0-d\cdot j]^2$$

for all the measurement points numbering i located in the row j.

The precision obtained in this case becomes excellent for all three parameters, since each of them is determined by all of the points of the parcel.

However, the third version of the algorithm assumes that, in advance:

the rows are in the same order as the bjs, for example, in increasing order;

the absence of untraveled rows (skipped rows) between the traveled rows is guaranteed;

the absence of rows traveled more than once (repeated rows) is guaranteed.

However, there is generally nothing to guarantee the last two conditions: it is even frequent for a farm machine to skip rows, even if only to maneuver more easily at the end of a row. That is why, in the next paragraph, a specific algorithm is proposed for detecting skipped or repeated rows. Once the good row numbers are found, the above algorithm becomes applicable.

The Case of Non-straight Rows

A more complex variant of the preceding algorithms can consider parallel non-straight rows, which may or may not be evenly spaced. This type of planting is sometimes encountered in mountainous terrain.

Figure 4A:
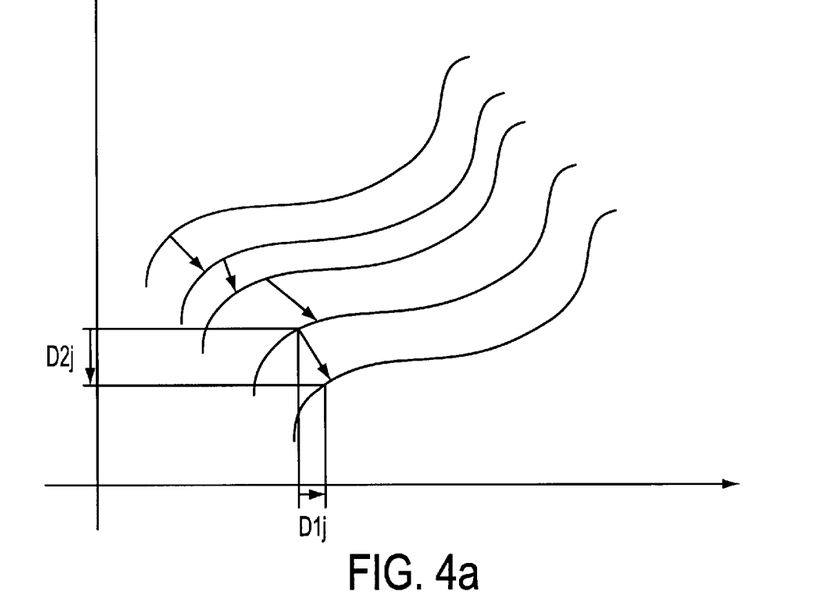
FIGS. 4a and 4b schematically illustrate the particular case of parallel rows that are not straight.

FIG. 4a represents non-straight, parallel, and unevenly spaced rows.

Figure 4B:
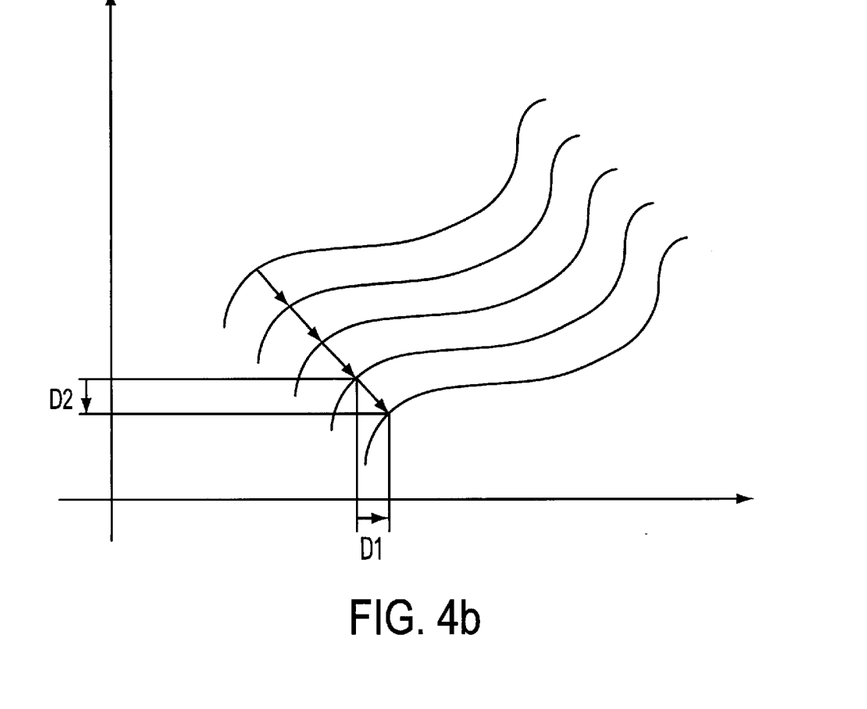

FIG. 4b represents non-straight, parallel, and evenly spaced rows.

For example, it is possible to model each row by means of a polynomial with a degree greater than 1. If a degree of 2 is used, the rows can be arcs of an ellipse, a circle, or a parabola, which already covers a great many cases. With higher degrees, almost any shape is possible. The mathematical formulation is more difficult, but the approach remains the same and the algorithm is still applicable.

The parallelism between two rows is written by passing from the equation of one row to that of the next row by means of the simultaneous substitution of $Y-D1j$ for $Y$ and of $X-D2j$ for $X$ where (D1j, D2j) is the translation vector that makes it possible to pass from the row j to the row j+1 (see FIG. 4a).

The even spacing is written simply by requiring the D1js and D2js to have the same values for all the values of j. (They play a role similar to the d in the third example considered above). This case is illustrated in FIG. 4b.

Thus, it may be seen that the method presented is very general, since it applies equally to:

straight lines;

parallel rows, whether straight or not;

parallel, evenly spaced rows, whether straight or not.

Ordering of the Rows

According to another characteristic arrangement of the invention, the natural order of the rows is reconstituted in the database, even if the rows have not been traveled in this order.

For this reason, it suffices to sort the bjs by increasing values. The algorithm is calculated so as to apply to all types of parallel rows whether or not they are straight or evenly spaced.

Detection of Skipped or Repeated Rows

According to another characteristic arrangement of the invention, the reset algorithm detects the untraveled rows located between the traveled rows.

Furthermore, the reset algorithm merges all or some of the rows traveled more than once.

This algorithm is applicable to parallel, evenly spaced rows. It is only presented in detail for the case of straight rows, but it can be extended based on the same principles for the case of non-straight rows.

The bjs are sorted by increasing values.

The apparent spaces between rows are calculated (Euclidean distance between the axes of the rows j and j+1): $r_j=(b_{j+1}b_j)/\sqrt{(1+a^2)}$ A reference space between rows r is determined. It is either declared by the farmer, who knows his space between rows, or considered to be automatically equal to the weighted average of the rjs.

The ratios rj/r are calculated, which must be close to 1 if the rows are different and adjacent. A relative margin of error e is determined, which always meets the condition: e<0.5; e=0.25, for example, is chosen.

If rj/r<e, then there is a repeat: the two rows are merged, which corresponds to one actual row passed through twice;

If rj/r>2−e, at least one row has been skipped; in this case, rj/r is rounded to the nearest whole k, and thus k−1 skipped rows are detected;

Otherwise, the rows are considered to be different and adjacent.

This algorithm is very robust, even if the stated spaces between rows are known without great precision (about 20%, for example). If there are not many consecutive skipped rows, it reconstitutes the entire row structure accurately.

Organization of the Data

According to another characteristic arrangement of the invention, each trunk of the perennial plants is individually located in the row, and is associated with the datum or data recorded by the machine during successive passes, which passes can be associated with farming operations that are different or are performed during different years.

At this stage, a file of the measurement points with the index i is created, with one point for each positioning data (obtained, for example, every second), or for each sensor data. This does not necessarily correspond to one point per plant, since the spacing of the measurements depends on the travel speed of the machine. The following step makes it possible to construct a measurement file organized according to the individual plants.

The corrected rows obtained by the preceding algorithms are already sorted, for example, by ordinates that are originally increasing if they are straight (or by increasing abscissas if the straight lines are vertical).

The end point of the row, always located at the same end, for example, the leftmost and bottommost end, is chosen as the origin of each row. Lastly, an average spacing between plants in the row, stated by the farmer, is determined and marked p.

For each measuring point i of the row j, it is then possible to find a whole k defined by:

$$k=\text{Rounded}(1+d(1,i)/p)$$

in which d(1,i) designates the distance from the first point of the row j to the measuring point i of this same row.

k is the number in the row j of the plant to which the piece of data i must be attached.

If several pieces of data are attached to the same plant (j, k), their sum is calculated if they are quantitative (harvested weight, for example), or their average if they are qualitative (sugar content, for example).

Finally, it must be noted that a correction is necessary for the measurement delays: as a function of the speed of the conveyors of the machine, the quantity of harvest to be measured is transported for a time t before being measured. The exact date of each measurement is saved in the data, and the position of the machine t seconds earlier is assigned to each piece of data measured.

The pair (j,k) makes it possible to locate any plant of the parcel accurately, as long as the passes are complete (all the rows are traveled), though not necessarily traveled in order. The same pair (j,k) will apply for a given plant, no matter what the farming operation involved, in a given season, or even from one year to another.

Application

According to another characteristic arrangement of the invention, this absolute positioning is used to determine recommendations for the following farming operations, localized directly at the individual plant level, all of which are practiced in viticulture, and most of which also exist in arboriculture.

winter pruning: this is the main operation for setting up production for the next year. It involves the wood, and is carried out manually, trunk by trunk. It defines the structure of the plant for the next season. By choosing the number of fruit bearing buds, the future fruit yield is controlled.

summer pruning or pollarding: this is done between June and August, and is largely mechanized. Its purpose is to eliminate the excess vegetative mass and to maintain good sun exposure of the fruit bearing zones.

leaf trimming: more localized than the preceding operation, leaf trimming consists of removing the leaves nearest the fruit, in order to aerate it, improve its sun exposure and prevent rotting. It is a difficult operation to gauge, and often manual.

thinning: this involves removing, at the beginning of the summer, a certain proportion of fruit, in order to allow the remaining fruit to grow bigger. This operation is manual.

Mapping Software

When the viticulturist or arboriculturist returns home after the harvest, he transfers the localized data he has just acquired into the farm computer and runs the mapping software.

This type of software already exists for mapping grain yields; the same principles of representation are used, but with different characteristics:

In large crops, the mapped fields have an area of several hundred hectares, whereas in perennial crops, parcels of 20 ha in France or 50 ha in other countries, correspond to the maximum sizes of the planted surfaces.

In large crops, the debate is still open as to the choice of scales for entry and representation, and no "natural" scale exists. In perennial crops, on the other hand, according to a characteristic arrangement of the invention, the optimum resolution has been chosen for a simple reason: it cannot be more precise than the individual plant, since that would not make sense; moreover, it has been verified that this level of precision is reached by the sensors available on the market, after resetting; the resolution chosen is therefore about one meter within a row. According to a characteristic arrangement of the invention, the density of the measurements performed is equal to the density of the individual plants, so that one measurement per plant is obtained. In other words, the resolution for the entry and representation of the measurements corresponds exactly to one measurement per plant.

According to another characteristic arrangement of the invention, the representation of the data is optimized by displaying separating spaces between the rows, and/or between the individual plants.

Figure 5A:
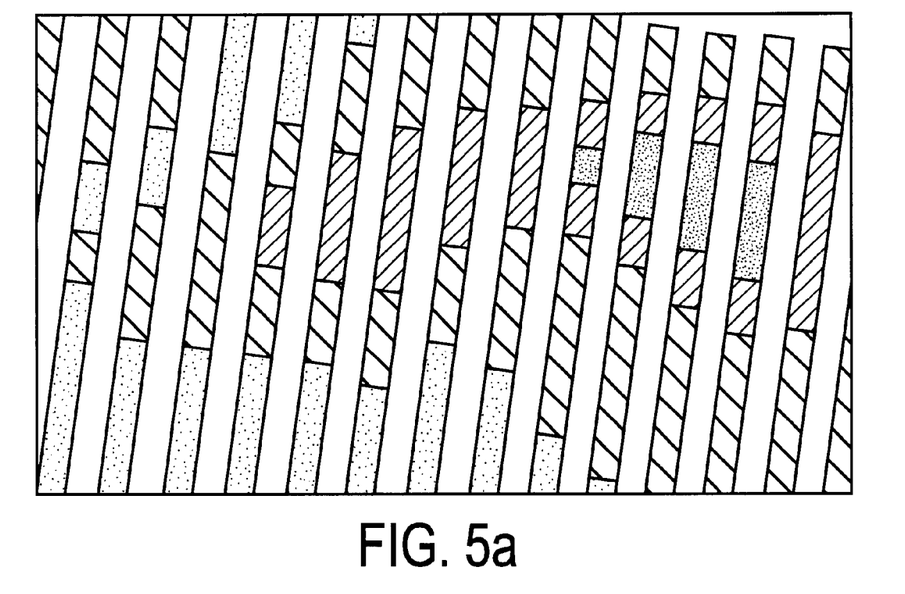
FIGS. 5a and 5b are examples of yield maps representing the empty spaces between rows.

At the scales chosen (displayed zones from 50 to 800 m long), it is possible to display the empty spaces between rows without interfering with readability. This helps the reader to recognize the parcel and locate the details. This process is illustrated by the schematic diagram of FIG. 5a.

Figure 5B:
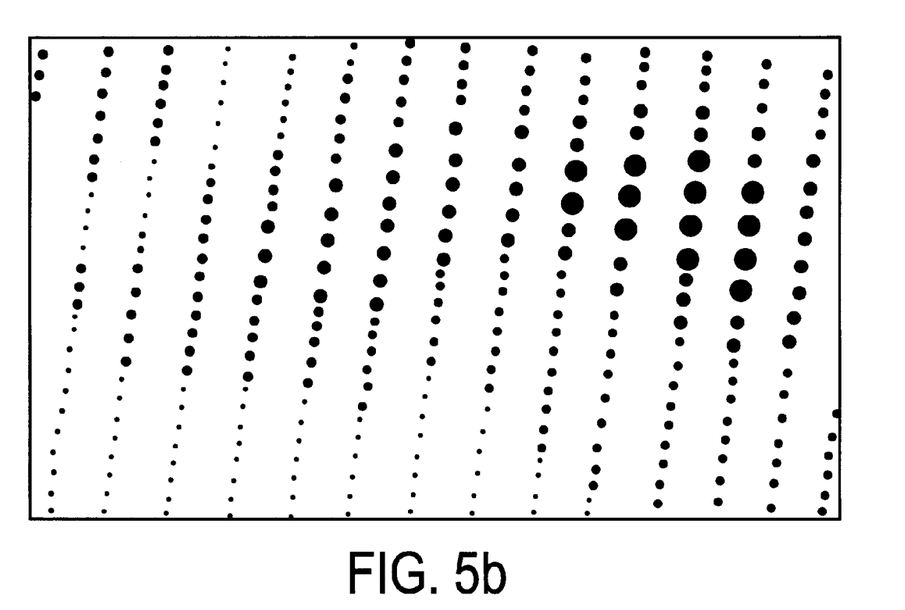

At even more detailed scales (displayed zones from 3 m to 100 m long), it is possible to display the individual plants. This process is illustrated by the schematic diagram of FIG. 5b, in which the surface of each circle is a function of the value of the localized data.

To smooth the data, various filtering schemas may be chosen, but they are all characterized by a preferred movement along the rows and not transversely.

According to another characteristic arrangement of the invention, the historical map of all the farming operations performed at the individual plant level are kept in the data base for several years.

The instant application is based upon French Patent Application No. 98/12405, filed Sept. 29, 1998, the disclosure of which is hereby expressly incorporated by reference thereto in its entirety, and the priority of which is hereby claimed under 35 USC 119.

What is claimed is:

1. A process for using localized agricultural data to optimize cultivation of perennial plants, said process comprising:

passing through a parcel of perennial plants, the passing being performed by one of a vehicle or a person on foot;

automatically producing positioning signals at several points in the parcel during the passing, by way of an absolute positioning sensor showing its longitude, latitude, and altitude, installed on board said vehicle or carried by the person on foot;

automatically measuring, by way of appropriate sensors, one or more pieces of agricultural data of the perennial plants at each of the several points, the sensors being installed on board said vehicle or carried by the person on foot;

recording the positioning signals and said data measured at the several points with a data processing unit, wherein the data processing unit is installed on board said vehicle or carried by the person on foot;

processing the positioning signals by way of a computer and an appropriate algorithm so as to improve positioning precision by using a fixed row structure in the parcel, so that a same row can be found again unambiguously during different passes; and representing in a real-time or deferred representation, at least one of, the positions passed through and said agricultural data in the form of a computer-generated map.

2. The process according to claim 1, wherein the algorithm is adapted for locating not only each row, but also each trunk of the perennial plants in the row, by calculating a distance traveled from one end of the row and for associating with a trunk the datum or data recorded during successive passes, which passes can by associated with farming operations that are different or are performed during different years.

3. The process according to claim 1, wherein the algorithm is adapted for improving portioning data using a parallel nature of the rows.

4. The process according to claim 1, wherein the algorithm is adapted for improving positioning data using a parallel and evenly spaced nature of the rows.

5. The process according to claim 1, wherein the algorithm is adapted for improving positioning data using a straight nature of the rows.

6. The process according to claim 1, wherein the algorithm is adapted for allowing a reconstruction in a data base of a natural order of the rows, even if the rows were not traveled in the natural order.

7. The process according to claim 4, wherein the algorithm is adapted and used for detecting untraveled rows located between traveled rows.

8. The process according to claim 1, wherein beginnings and ends of the rows are detected and recorded by way of an appropriate sensor or manual data entry.

9. The process according to claim 8, wherein the beginnings and ends of the rows are detected by a signal of a starting and a stopping of active elements of the farm machine performing the passing.

10. The process according to claim 8, wherein the beginnings and ends of the rows are detected by an ultrasound sensor sensing the presence of vegetation.

11. The process according to claim 8, wherein the beginnings and ends of the rows are detected by fixed markers placed at the ends of the rows.

12. The process according to claim 1, wherein separating spaces between rows, and at least one of the individual plants, are revealed by a representation of data.

13. The process according to claim 2, wherein localized data are used to recommend operations localized directly at an individual plant level, especially winter pruning, summer pruning, leaf trimming, or thinning.

14. The process according to claim 2, wherein a record of one or more farming operations performed at an individual plant level is maintained for several years.

15. The process according to claim 1, wherein the process is applied to grape vines and to a grape harvesting operation, and wherein at least two types of data, one type quantitative, linked to the yield of a harvest, another type qualitative, are measured by means of appropriate sensors and recorded for each point.

16. The process according to claim 1, wherein a density of measurements performed is equal to a density of individual plants, so that one measurement per plant is obtained.

17. The process according to claim 1, wherein the computer-generated map is designed to highlight separating spaces between rows and/or between the individual plants.

18. The process according to claim 1, wherein the absolute positioning sensor showing the longitude, latitude, and altitude is of a differential GPS type.

19. The process according to claim 15, wherein the qualitative type data is sugar content or acidity.

20. A process for using localized agricultural data to optimize cultivation of perennial plants, the process comprising:

passing through at least one row of a parcel of perennial plants, the passing being accomplished by a moving object, the object being one of a user and a vehicle;

automatically producing positioning signals at several points along the at least one row in the parcel during the passing;

using GPS to determine a longitude, latitude, and altitude, for each of the several points;

automatically measuring with at least one sensor one or more pieces of agricultural data of the perennial plants at each of the several points, the at least one sensor being installed on the object;

recording a positioning signal at each of the several points with a data processing unit, the data processing unit being installed on board the object;

recording data measured at the several points with the data processing unit;

processing each of the positioning signals using a computer and an algorithm;

representing in one of real-time and deferred representation, one of the positions passed through and the agricultural data as a computer-generated map, wherein the process provides for an improve positioning precision by using a fixed row structure in the parcel, such that a same row can be found again unambiguously during different passes of the object.

* * * * *